(12) United States Patent
Arasan et al.

(10) Patent No.: US 10,445,324 B2
(45) Date of Patent: Oct. 15, 2019

(54) SYSTEMS AND METHODS FOR TRACKING SENSITIVE DATA IN A BIG DATA ENVIRONMENT

(71) Applicant: American Express Travel Related Services Company, Inc., New York, NY (US)

(72) Inventors: Ravi Arasan, Basking Ridge, NJ (US); Sandeep Bose, Scottsdale, AZ (US); Xiaoyang Chen, Harrison, NJ (US); Debasish Das, New York, NY (US); Matthew Kent Meyer, Brooklyn, NY (US); Gurusamy Ramasamy, Princeton, NJ (US); Jeremy D. Seideman, Brooklyn, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 649 days.

(21) Appl. No.: 14/944,898

(22) Filed: Nov. 18, 2015

(65) Prior Publication Data

US 2017/0139674 A1     May 18, 2017

(51) Int. Cl.
*G06F 16/2457* (2019.01)

(52) U.S. Cl.
CPC ................. *G06F 16/2457* (2019.01)

(58) Field of Classification Search
None
See application file for complete search history.

(56) References Cited

U.S. PATENT DOCUMENTS

| | | | |
|---|---|---|---|
| 6,820,168 B2 | 11/2004 | Tanaka | |
| 8,090,402 B1 | 1/2012 | Fujisaki | |
| 8,572,679 B1 | 10/2013 | Wang | |
| 9,092,502 B1 | 7/2015 | Cannaliato | |
| 9,176,966 B2 | 11/2015 | Silverstein | |
| 9,584,517 B1* | 2/2017 | Roth | H04L 63/10 |
| 9,785,953 B2* | 10/2017 | Desai | G06Q 30/02 |
| 2002/0023215 A1* | 2/2002 | Wang | G06Q 20/00 713/171 |
| 2003/0028529 A1* | 2/2003 | Cheung | G06Q 30/02 |
| 2004/0028227 A1 | 2/2004 | Yu | |
| 2005/0027723 A1* | 2/2005 | Jones | G06F 17/30675 |

(Continued)

OTHER PUBLICATIONS

U.S. Appl. No. 14/944,902, filed Nov. 18, 2015 and entitled Integrated Big Data Interface for Multiple Storage Types.

(Continued)

*Primary Examiner* — Wilson Lee
(74) *Attorney, Agent, or Firm* — Snell & Wilmer, L.L.P.

(57) ABSTRACT

A system may retrieve a pattern from a pattern database with the pattern identifying a type of sensitive data. The system may also retrieve data identified by a variable from a big data management system. The system may then match the data to the pattern to detect the type of sensitive data in the data. An output may be generated in response to the data matching the pattern. A variable access permission may be retrieved for the variable from a permissions repository, a sensitive data permission may be retrieved for the type of sensitive data from the permissions repository, and the variable access permission may be compared to the sensitive data permission to detect a discrepancy.

17 Claims, 5 Drawing Sheets

(56) References Cited

U.S. PATENT DOCUMENTS

| | | |
|---|---|---|
| 2005/0049924 A1 | 3/2005 | DeBettencourt |
| 2005/0144451 A1* | 6/2005 | Voice .................. G06F 21/34 713/170 |
| 2005/0149761 A1* | 7/2005 | Chiviendacz ...... H04N 1/00127 726/19 |
| 2006/0136570 A1* | 6/2006 | Pandya ................. H04L 63/20 709/217 |
| 2006/0282864 A1 | 12/2006 | Gupte |
| 2006/0294354 A1 | 12/2006 | McCall |
| 2007/0005648 A1 | 1/2007 | Armanino |
| 2007/0005967 A1* | 1/2007 | Mister .................. G06F 21/36 713/168 |
| 2007/0045403 A1* | 3/2007 | Slonecker, Jr. ...... G06Q 20/354 235/380 |
| 2007/0064598 A1* | 3/2007 | Nooner ............... G06Q 20/102 370/229 |
| 2008/0229352 A1 | 9/2008 | Pino |
| 2008/0256253 A1 | 10/2008 | Branson |
| 2008/0275951 A1 | 11/2008 | Hind |
| 2009/0013194 A1* | 1/2009 | Mir ..................... G06F 21/577 713/193 |
| 2009/0113110 A1 | 4/2009 | Chen |
| 2009/0136121 A1* | 5/2009 | Nakagaki .............. G06T 7/0006 382/149 |
| 2009/0204613 A1* | 8/2009 | Muroi .................. G06F 21/56 |
| 2009/0254463 A1* | 10/2009 | Tomchek .............. G06Q 20/12 705/30 |
| 2010/0088338 A1* | 4/2010 | Pavoni, Jr. ............ G06Q 20/02 707/770 |
| 2010/0198769 A1 | 8/2010 | Gould |
| 2012/0066107 A1* | 3/2012 | Grajetzki .............. G06Q 20/04 705/35 |
| 2012/0079537 A1 | 3/2012 | Kalidindi |
| 2012/0185925 A1 | 7/2012 | Barkie |
| 2012/0215684 A1 | 8/2012 | Kidron |
| 2013/0124413 A1* | 5/2013 | Itwaru ................. G06Q 20/4012 705/44 |
| 2013/0187926 A1 | 7/2013 | Silverstein |
| 2013/0218769 A1* | 8/2013 | Pourfallah ............ G06Q 20/10 705/44 |
| 2014/0046842 A1* | 2/2014 | Irudayam .............. G07F 19/202 705/43 |
| 2014/0165133 A1* | 6/2014 | Foley ................... H04L 63/14 726/1 |
| 2014/0365363 A1 | 12/2014 | Knudsen |
| 2015/0026462 A1 | 1/2015 | Ramesh et al. |
| 2015/0127516 A1* | 5/2015 | Studnitzer ............. G06Q 40/04 705/37 |
| 2015/0150023 A1 | 5/2015 | Johnson |
| 2015/0161301 A1* | 6/2015 | Begur .................. G06F 17/5086 716/105 |
| 2015/0178532 A1* | 6/2015 | Brule .................. G06K 19/0717 340/5.61 |
| 2015/0193243 A1 | 7/2015 | Varkhedi |
| 2015/0227931 A1* | 8/2015 | Genovez ............... G06F 21/32 705/72 |
| 2015/0261881 A1 | 9/2015 | Wensel |
| 2015/0261948 A1* | 9/2015 | Marra .................. G06F 21/34 726/4 |
| 2015/0324900 A1 | 11/2015 | Starikova |
| 2015/0370232 A1 | 12/2015 | Kohn |
| 2016/0014148 A1* | 1/2016 | Lee .................... H04L 63/1425 726/22 |
| 2016/0020297 A1 | 1/2016 | Kuang |
| 2016/0070971 A1* | 3/2016 | Nakashima ............ G06T 7/74 348/87 |
| 2016/0080493 A1* | 3/2016 | Roth .................. G06F 9/45529 709/203 |
| 2016/0088566 A1 | 3/2016 | Stephens |
| 2016/0092557 A1 | 3/2016 | Stojanovic |
| 2016/0189119 A1 | 6/2016 | Bowman |
| 2016/0203478 A1* | 7/2016 | Gardiner ............. G06Q 20/382 705/16 |
| 2016/0314403 A1 | 10/2016 | Chakraborty |
| 2017/0017708 A1 | 1/2017 | Fuchs |
| 2017/0085445 A1 | 3/2017 | Layman |
| 2017/0091847 A1 | 3/2017 | Cama |
| 2017/0154067 A1 | 6/2017 | Hazlewood |
| 2017/0169068 A1 | 6/2017 | Kennedy, Jr. |
| 2017/0295062 A1 | 10/2017 | Tang |
| 2017/0364584 A1 | 12/2017 | Ginter |

OTHER PUBLICATIONS

U.S. Appl. No. 14/944,979, filed Nov. 18, 2015 and entitled System and Method for Reading and Writing to Big Data Storage Formats.
U.S. Appl. No. 14/945,032, filed Nov. 18, 2015 and entitled System and Method for Creating, Tracking, and Maintaining Big Data Use Cases.
U.S. Appl. No. 14/944,849, filed Nov. 18, 2015 and entitled System and Method for Automatically Capturing and Recording Lineage Data for Big Data Records.
U.S. Appl. No. 14/944,961, filed Nov. 18, 2015 and entitled System and Method Transforming Source Data Into Output Data in Big Data Environments.
USPTO; Non-Final Office Action dated Sep. 21, 2017 in U.S. Appl. No. 14/945,032.
USPTO; Non-Final Office Action dated Dec. 1, 2017 in U.S. Appl. No. 114/944,961.
USPTO; Non-Final Office Action dated Dec. 28, 2017 in U.S. Appl. No. 14/944,849.
USPTO, Non-Final Office Action dated Feb. 14, 2018 in U.S. Appl. No. 14/944,902.
USPTO, Notice of Allowance dated Mar. 26, 2018 in U.S. Appl. No. 14/944,849.
USPTO, Non-Final Office Action dated Apr. 5, 2018 in U.S. Appl. No. 14/944,979.
Notice of Allowance dated May 22, 2018 in U.S. Appl. No. 14/944,902.
Notice of Allowance dated Jun. 12, 2018 in U.S. Appl. No. 14/944,961.
Advisory Action dated Jun. 27, 2016 in U.S. Appl. No. 14/945,032.
U.S. Appl. No. 16/036,326 dated Jul. 16, 2018 and titled Lineage Data for Big Data Records.
Non-Final Office Action dated Aug. 3, 2018 in U.S. Appl. No. 14/945,032.
Non-Final Office Action dated Feb. 7, 2018 in U.S. Appl. No. 14/972,314.
Final office Action dated Apr. 18, 2018 in U.S. Appl. No. 14/945,032.
Non-final Offive Action dated Jun. 7, 2018 U.S. Appl. No. 14/994,311.
Non-Final Office Action dated Jun. 12, 2018 in U.S. Appl. No. 15/897,747.
Non-Final Office Action dated Nov. 28, 2018 in U.S. Appl. No. 15/383,645.

* cited by examiner

SYSTEMS AND METHODS FOR TRACKING SENSITIVE DATA IN A BIG DATA ENVIRONMENT

FIELD

The present disclosure relates to tracking sensitive data in big data environments.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. However, traditional relational databases may not be capable of sufficiently handling the size of the tables that big data creates.

As a result, the massive amounts of data in big data sets may be stored in numerous different types of data storage. Sensitive data may be copied and stored in various locations across the different types of data storage for various use cases. Tracking the sensitive data may be difficult as users may copy and distribute data. Typically, raw data is mapped or derived into output data. The mapped values may change as the raw source data changes. The change in raw data may result in sensitive data, such as personally identifying information (PII), appearing unexpectedly in output columns or files. Varying source data contents may thus impede tracking sensitive data in a big data environment.

SUMMARY

A system, method, and computer readable medium (collectively, the "system") is disclosed for scanning a big data management system to identify sensitive data. The system may retrieve a pattern from a pattern database with the pattern identifying a type of sensitive data. The system may also retrieve data identified by a variable from a big data management system. The system may then match the data to the pattern to detect the type of sensitive data in the data. An output may be generated in response to the data matching the pattern.

In various embodiments, a variable access permission may be retrieved for the variable from a permissions repository, a sensitive data permission may be retrieved for the type of sensitive data from the permissions repository, and the variable access permission may be compared to the sensitive data permission to detect a discrepancy. The system may schedule retrieving the pattern from the pattern database to execute automatically at a predetermined time. The output may comprise a log, an output file, an email, and/or a message that flags at least one of the data, the variable access permission, or the sensitive data permission for review. A new pattern may be added to the pattern database to identify a new type of sensitive data. The pattern may comprise at least one of a regular expression or a string. The system may assign a priority of execution to the comparing the data to the pattern to run the comparing the data to the pattern as a background process.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

Phrases and terms similar to "internal data" and "PII" may include any identifying or sensitive data related to an individual. For example, data that a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

The present disclosure provides a system, method, and computer program product for scanning a big data environment for sensitive data. Sensitive data may come in the form of internal data and/or PII that identify an individual. The scanning tool of the present disclosure may identify PII in a big data environment and check access permissions to determine whether the permissions are properly or improperly set. Access control may be monitored at a column level, a file level, and/or a table level. The automated scanning system may identify sensitive data stored in a big data environment and flag, update, report, or add access permissions in a permissions repository.

Figure 1:
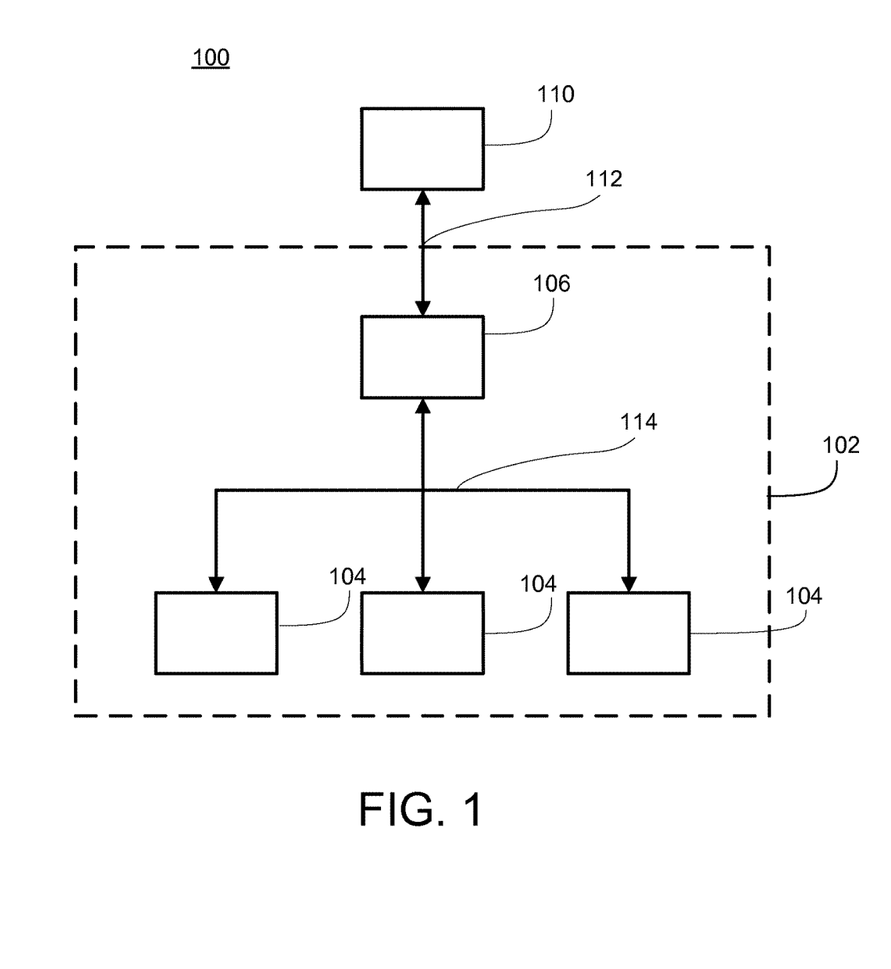
FIG. 1 illustrates an exemplary system for storing, reading, and writing big data sets, in accordance with various embodiments.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster may be, for example, a Hadoop® cluster configured to process and store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, DFS 100 may process hundreds of thousands of records from a single data source. DFS 100 may also ingest data from hundreds of data sources. Nodes 104 may process the data in parallel to expedite the processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104. Each node 104 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 2:
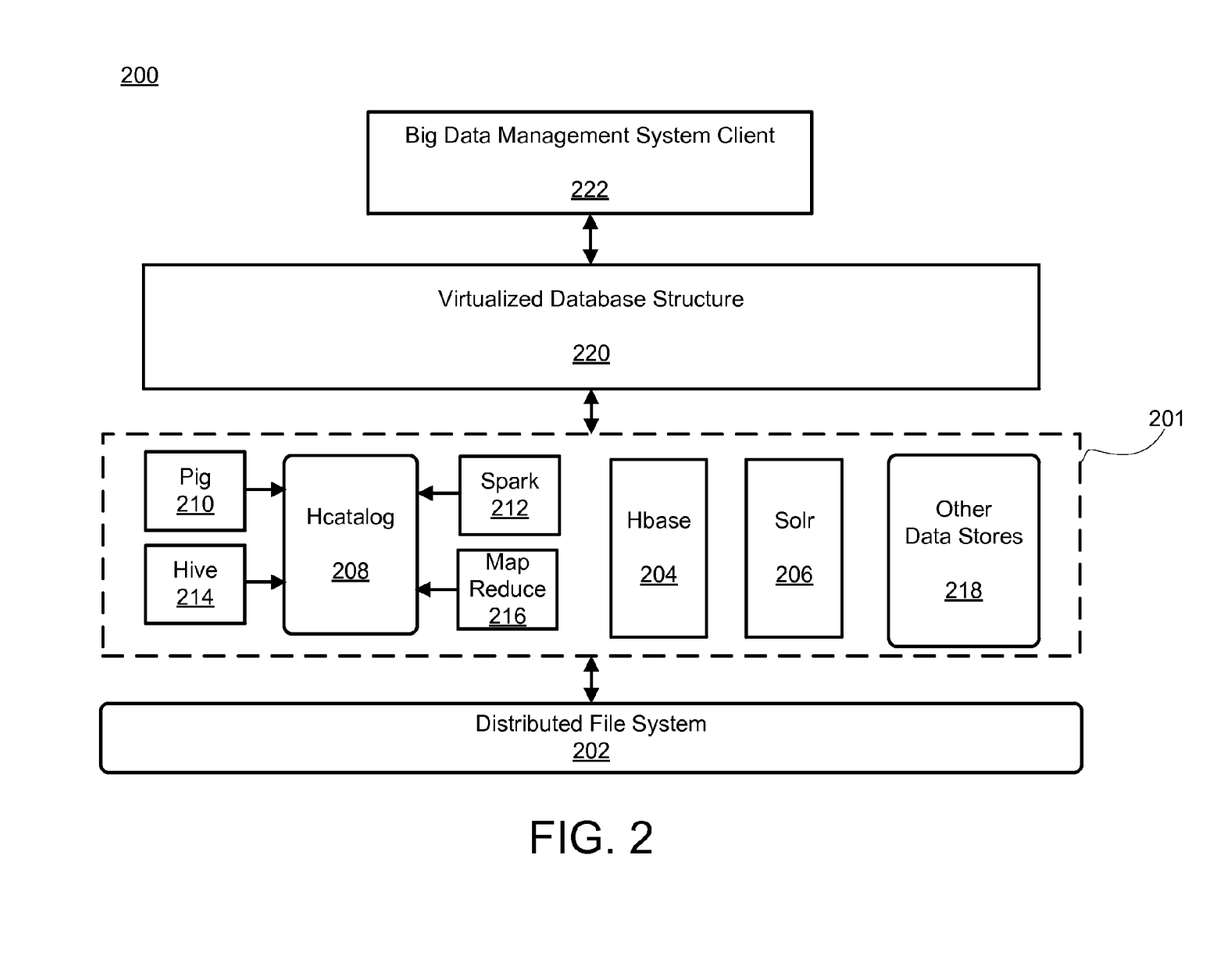
FIG. 2 illustrates an exemplary big data management system supporting a unified, virtualized interface for multiple data storage types, in accordance with various embodiments.

With reference to FIG. 2, an exemplary architecture of a big data management system (BDMS) 200 is shown, in accordance with various embodiments. BDMS 200 may be similar to or identical to DFS 100 of FIG. 1, for example. DFS 202 may serve as the physical storage medium for the various data storage formats 201 of DFS 202. A non-relational database 204 may be maintained on DFS 202. For example, non-relational database 204 may comprise an HBase™ storage format that provides random, real time read and/or write access to data, as described and made available by the Apache Software Foundation at http://hbase.apache.org/.

In various embodiments, a search platform 206 may be maintained on DFS 202. Search platform 206 may provide distributed indexing and load balancing to support fast and reliable search results. For example, search platform 206 may comprise a Solr® search platform as described and made available by the Apache Software Foundation at http://lucene.apache.org/solr/.

In various embodiments, a data warehouse 214 such as Hive® may be maintained on DFS 202. The data warehouse 214 may support data summarization, query, and analysis of warehoused data. For example, data warehouse 214 may be a Hive® data warehouse built on Hadoop® infrastructure. A data analysis framework 210 may also be built on DFS 202 to provide data analysis tools on the distributed system. Data analysis framework 210 may include an analysis runtime environment and an interface syntax such similar to those offered in the Pig platform as described and made available by the Apache Software Foundation at https://pig.apache.org/.

In various embodiments, a cluster computing engine 212 for high-speed, large-scale data processing may also be built on DFS 202. For example, cluster computing engine 212 may comprise an Apache Spark™ computing framework running on DFS 202. DFS 202 may further support a MapReduce layer 216 for processing big data sets in a parallel, distributed manner to produce records for data storage formats 201. For example, MapReduce layer 216 may be a Hadoop® MapReduce framework distributed with the Hadoop® HDFS as specified by the Apache Software Foundation at http://hadoop.apache.org/docs/. The cluster computing engine 212 and MapReduce layer 216 may ingest data for processing, transformation, and storage in data storage formats 201 using the distributed processing and storage capabilities of DFS 202.

In various embodiments, DFS 202 may also support a table and storage management layer 208 such as, for example, an HCatalog installation. Table and storage management layer 208 may provide an interface for reading and writing data for multiple related storage formats. Continuing the above example, an HCatalog installation may provide an interface for one or more of the interrelated technologies described above such as, for example, Hive®, Pig, Spark®, and Hadoop® MapReduce.

In various embodiments, DFS 202 may also include various other data storage formats 218. Other data storage formats 218 may have various interface languages with varying syntax to read and/or write data. In fact, each of the above disclosed storage formats may vary in query syntax and interface techniques. Virtualized database structure 220 may provide a uniform, integrated user experience by offering users a single interface point for the various different data storage formats 201 maintained on DFS 202. Virtualized database structure 220 may be a software and/or hardware layer that makes the underlying data storage formats 201 transparent to client 222 by providing variables on request. Client 222 may request and access data by requesting variables from virtualized database structure 220. Virtualized database structure 220 may then access the variables using the various interfaces of the various data storage formats 201 and return the variables to client 222.

In various embodiments, the data stored using various above disclosed data storage formats 201 may be stored across data storage formats 201 and accessed at a single point through virtualized database structure 220. The variables accessible through virtualized database structure 220 may be similar to a column in a table of a traditional RDBMS. That is, the variables identify data fields available in the various data storage formats 201.

In various embodiments, variables may be stored in a single one of the data storage formats 201 or replicated across numerous data storage formats 201 to support different access characteristics. Virtualized database structure 220 may comprise a catalog of the various variables available in the various data storage formats 201. The cataloged variables enable BDMS 200 to identify and locate variables stored across different data storage formats 201 on DFS 202. Variables may be stored in at least one storage format on DFS 202 and may be replicated to multiple storage formats on DFS 202. The catalog of virtualized database structure 220 may thus track the location of a variable available in multiple storage formats.

The variables may be cataloged as they are ingested and stored using data storage formats 201. The catalog may track the location of variables by identifying the storage format, the table, and/or the variable name for each variable available through virtualized database structure 220. The catalog may also include metadata describing what the variables are and where the variables came from such as data type, original source variables, timestamp, access restrictions, sensitivity of the data, and/or other descriptive metadata. For example, internal data and/or PII may be flagged as sensitive data subject to access restrictions by metadata corresponding to the variable containing the internal data and/or PII. Metadata may be copied from the storage formats 201 or generated separately for virtualized database structure 220.

In various embodiments, virtualized database structure 220 may provide a single, unified, and virtualized data storage format that catalogues accessible variables and provides a single access point for records stored on data storage formats 201. Client 222 (which may operate using similar hardware and software to client 110 of FIG. 1) may access data stored in various data storage formats 201 via the virtualized database structure 220. In that regard, virtualized database structure 220 may be a single access point for data stored across the various data storage formats 201 on DFS 202.

In various embodiments, virtualized database structure 220 may store and maintain the catalog of variables including locations and descriptive metadata, but virtualized database structure 220 may not store the actual data contained in each variable. The data that fills the variables may be stored on DFS 202 using data storage formats 201. Virtualized database structure 220 may enable read and write access to the data stored in data storage formats 201 without a client system having knowledge of the underlying data storage formats 201.

Figure 3:
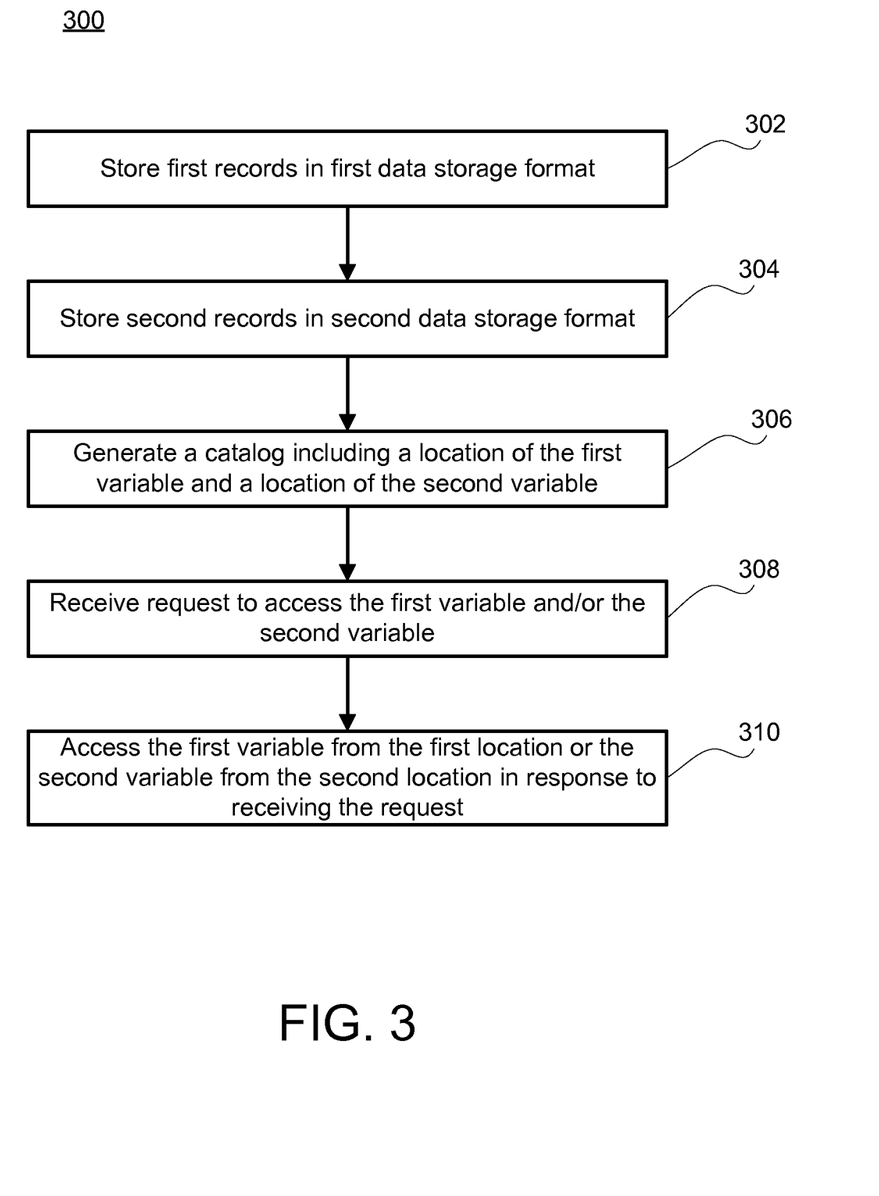
FIG. 3 illustrates an exemplary process for providing a virtualized database structure that appears as a single data storage format to a client but interacts with various multiple data storage formats to read and write data, in accordance with various embodiments.

With reference to FIG. 3, a process 300 for maintaining a virtualized database structure using BDMS 200 is shown, in accordance with various embodiments. BDMS 200 may store a plurality of first records in a first data storage format (Block 302). The first records (e.g., rows in a table) may include one or more variables (e.g., columns in a table) with each variable identifying a data field of the records. The first data storage format may include one of data storage formats 201 described above with reference to FIG. 2.

In various embodiments, BDMS 200 may then store a plurality of second records in a second data storage format (Block 304). The second data storage format may also comprise one of data storage formats 201 described above with reference to FIG. 2. The second data storage format may be different than the first data storage format. Thus, the second data storage format may use a different interface than the first data storage format for reading or writing data.

In various embodiments, BDMS 200 may generate a catalog including a location of the first variable and a location of the second variable (Block 306). The location of the first variable may identify the first data storage format as the location of the first variable. Similarly, the location of the second variable may identify the second data storage format as the location of the second variable. Thus, the first variable and the second variable may be generated and/or stored using different data storage formats 201. In that regard, a different interface may be used to read and/or write data of the first variable than is used to read and/or write data of the second variable. The catalog may also be generated to include metadata describing the details of the variables such as, for example, data type, access permission, original source variable, timestamp, description, age, version number, or transformation history.

In various embodiments, BDMS 200 may receive a request to access the first variable and/or the second variable (Block 308). The request may not identify the first data storage format or the second data storage format. Instead, the request may identify the variable for which access is requested. BDMS 200 may locate the variable for which access is requested by consulting the catalog maintained by virtualized database structure 220. In that regard, BDMS 200 may provide a unified point of access for the first data storage format and second data storage format despite the different data structures of the various data storage formats 201.

In various embodiments, BDMS 200 may access the first variable from the first location or the second variable from the second location (Block 310). With brief reference to FIG. 2, the request for a variable may come from a client 222 and may be received by virtualized database structure 220 of BDMS 200. Virtualized database structure 220 may then look up the requested variable in the catalog to identify the location of the variable. The location of the variable may include the data storage format(s) that maintain the variable and an identifier for the variable within the data storage format (e.g., a table and column number corresponding to the variable). The requested variable and corresponding data may be returned to client 222 that made the request. Virtualized database structure 220 may thus appear as a single data storage format to client 222.

Figure 4:
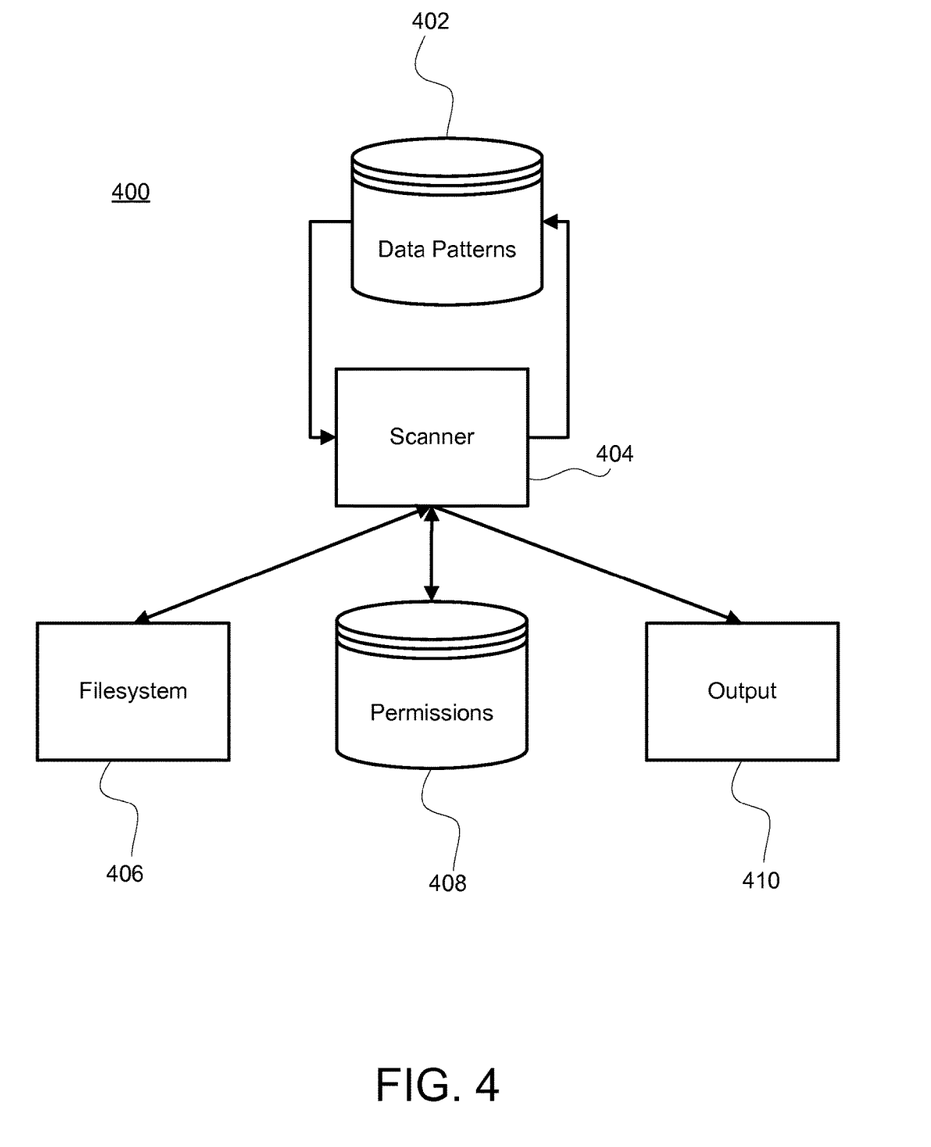
FIG. 4 illustrates an exemplary system for scanning a big data environment and identifying sensitive information, in accordance with various embodiments.

With reference to FIG. 4, an exemplary data detection system 400 for automatically scanning BDMS 200 for sensitive data is shown, in accordance with various embodiments. Data detection system 400 comprises a pattern database 402. Pattern database 402 may contain a series of patterns for matching against data contained in BDMS 200. Pattern database 402 may contain exact strings for matching with data contained in BDMS 200. Pattern database 402 may also contain patterns for matching with data contained in BDMS 200. Patterns may be a collection of regular expressions (regex) written to match a sensitive data. Patterns may thus have a format similar to those used in text pattern matching utilities such as grep, for example.

In various embodiments, pattern database 402 may store data in any suitable format including a flat file, a CSV file, a relational database, a non-relational database, a list, or any other suitable storage format. Patterns and strings may be added to pattern database 402 and removed from pattern database 402 using machine learning techniques and/or manually by users. In that regard, scanner 404 may access up-to-date patterns by retrieving the patterns from the pattern database 402 before completing a scan. Patterns may, in some embodiments, include an action or action code associated with the pattern to be taken in response to finding a pattern match. Actions and action codes may cause scanner 404 to take appropriate steps such as quarantining the data, flagging the data for review, locking down a user account lacking permission to view the data, incrementing a counter for the number of matches in a column, and/or modifying permissions to access data, for example.

In various embodiments, the patterns and strings stored in pattern database 402 may be read by scanner 404. Scanner 404 compares data in filesystem 406 (of BDMS 200, for example) to the strings and patterns of pattern database 402 to locate matches. The comparison may be carried out by comparing the patterns one-by-one to the data, by comparing a batch of the patterns to the data, and/or by comparing all of the patterns to the data. Similarly, the data may be processed one record at a time, in batches of records, or as a complete table of records. The processing may be carried out on a distributed file system on which records are stored. Each node of the distributed file system containing a record may process the pattern matching against that record. In that regard, a distributed file system may process the pattern matching. The pattern matching may also be executed on a single system reading data values from filesystem 406 using a data access interface to read each value. For example, scanner 404 may submit a query to filesystem 406 of BDMS 200 and compare the patterns stored in pattern database 402 to the returned data. Scanner 404 may also scan files at rest on disk without using an interface of a BDMS 200. Scanner 404 may thus run on the hardware of BDMS 200 or on a separate system.

In various embodiments, scanner 404 may execute the comparison between patterns and data while running as a background process. Scanner 404 may operate as a low-priority process so that scheduled high-priority tasks may complete prior to running scanner 404 without scanner 404 meaningfully delaying the high-priority tasks. Scanner 404 may also be run as a high-priority process to enable a scan to complete more quickly than a low-priority process. The run-time priority of scanner 404 may thus be set to control the resources consumed by scanner 404.

In various embodiments, scanner 404 may be schedule to automatically execute at a predetermined time and/or on predetermined intervals. For example, scanner 404 may be scheduled to execute daily at 11:00 pm. Scanner 404 may also be configured to execute in response to a triggering event, such as a data update on filesystem 406 or upon completion of a previous scan, for example.

In various embodiments, scanner 404 may consult permissions repository 408 to determine whether the permissions for data align with the type of data present. For example, access permissions for a variable may match or conflict with the data present in the variable. Variable is used as an identifier for a collection of data and is typically a column in a table; however, a variable may also identify other collections of data such as a file or a table.

In various embodiments, permission repository 408 may be a single repository or a collection of permission repositories. Permission repository 408 may also be stored in any data storage format including a database, a flat file, a spreadsheet, a text file, a big data storage format, or any suitable data storage format for storing and maintaining permissions. Scanner 404 may check user permissions and/or application permissions for a variable in which a match was detected. Scanner 404 may also check whether the user and/or application have permission to view sensitive data such as PII. Scanner 404 may then compare the variable access permissions to the sensitive data permissions to detect conflicting permissions.

In various embodiments, permissions and match data may be written to output 410 for reporting and/or action in response to the variable access permissions conflicting with the sensitive data permissions. Scanner 404 may also modify the variable access permissions to match the sensitive data permissions in response to the variable access permissions conflicting with the sensitive data permissions. Scanner 404 may act on permission violations by counting the violations until a threshold level is reached. For example, 3 records out of 1,000,000 records containing PII may indicate false positives, while 300,000 records out of 1,000,000 records containing PII may merit closer review and auditing. Scanner 404 may thus output PII pattern matching data in response to a number of PII occurrences reaching a threshold value such as 5%, 10%, 15%, 20%. Any percentage of records or number of records may be predetermined and set as a threshold to control the level of reporting.

In various embodiments, scanner 404 may write permissions and match data in output 410. Output 410 may comprise a log, an output file, an email, and/or a message. Matches may be written in output 410 containing information describing the match such as the matching record (i.e., row), a column name (i.e., a variable name) of the matched data, the number of matches in a column, the pattern matched, the data that the pattern matched, the type of data the pattern matched (e.g., a name or social security number), the table containing the matched record, a timestamp, permissions, and/or any other suitable data regarding the match. The records may be, for example, rows in a text file delimited by newlines. The output may contain data describing one or more match detected by scanner 404.

Figure 5:
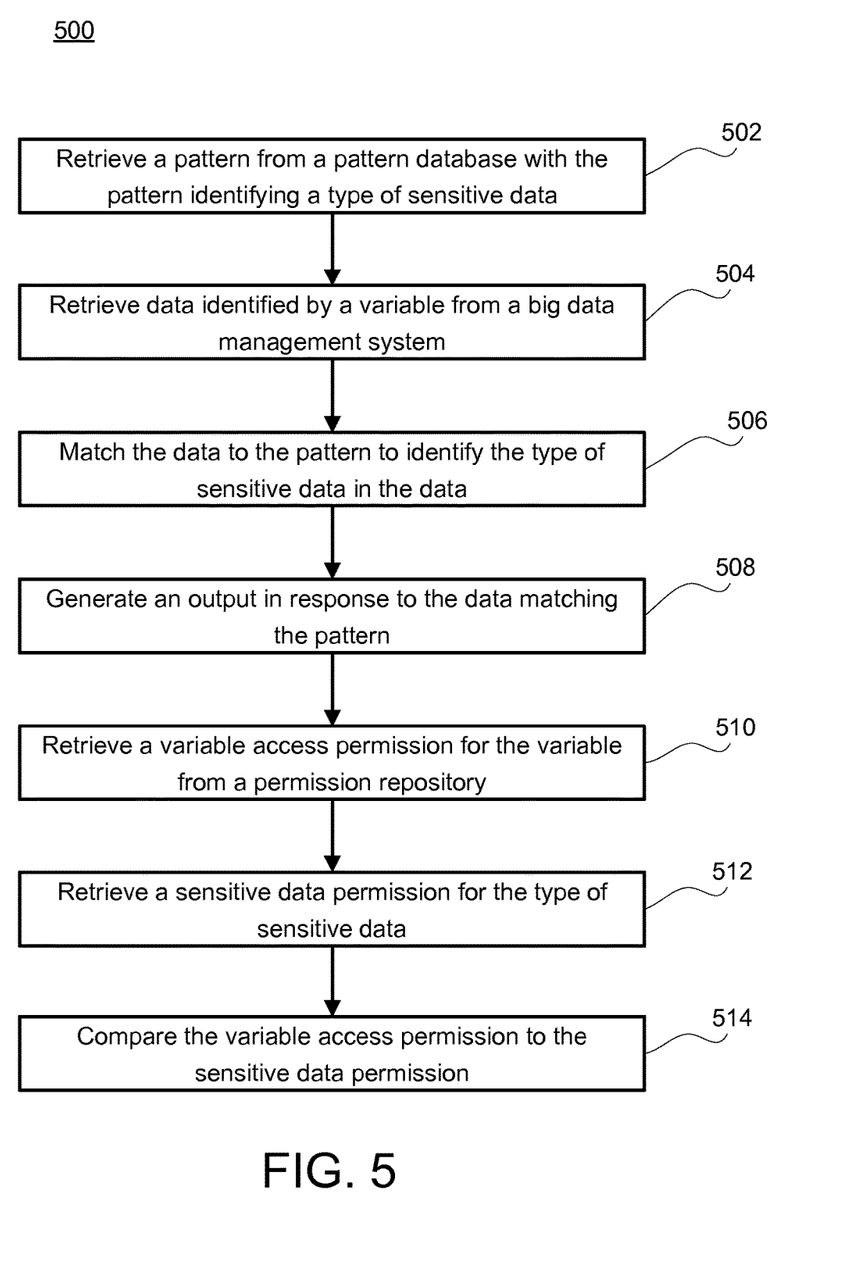
FIG. 5 illustrates an exemplary process for identifying sensitive information in a big data environment, in accordance with various embodiments.

With reference to FIG. 5, an exemplary process 500 for scanning a BDMS 200 is shown, in accordance with various embodiments. Scanner 404 may retrieve a pattern from a pattern database 402 with the pattern identifying a type of sensitive data (Block 502). The pattern may be a string, a regular expression, or another pattern suitable for identifying sensitive data and/or PII such as names, dates of birth, addresses, phone numbers, social security numbers, gender, ethnicity, age, financials, account numbers, or other sensitive information. Pattern database 402 may be modified by adding and deleting patterns in the database. New patterns may be added to the pattern database to identify new types of sensitive data. The type of sensitive data detected by scanner 404 may thus be controlled by monitoring, adding, changing, and/or deleting patterns from pattern database 402.

In various embodiments, scanner 404 may retrieve data identified by a variable from a big data management system (Block 504). The variable may identify a collection of data. In that regard, a variable may be a column of data in a table, a table, a file, or another identifiable collection of data.

In various embodiments, scanner 404 may then match the data to the pattern to detect the type of sensitive data in the data (Block 506). The pattern may be matched to data by comparing the pattern to the data identified by a variable and detecting text that matches the pattern. Regular expressions and/or strings may be used as patterns for comparison to data in filesystem 406. In that regard, scanner 404 may be a pattern matching system that detects text patterns in filesystem 406.

In various embodiments, scanner 404 may generate an output in response to the data matching the pattern (Block 508). The output may include a log, an output file, an email, and/or a message that flags the data for review. The output may also flag the relevant permissions for the identified data and/or permission discrepancies detected for further review.

In various embodiments, scanner 404 may retrieve a variable access permission for the variable from permission repository 408 (Block 510). Scanner 404 may also retrieve a sensitive data permission for the type of sensitive data (Block 512). Scanner 404 may then compare the variable access permission and the sensitive data permission (Block 514). The variable access permission may be compared to the sensitive data permission to detect a discrepancy or a conflict between the variable access permission and the sensitive data permission. For example, a variable access permission may indicate a user has access to a variable containing PII, while the sensitive data permission may indicate that the user does not have access to PII. The discrepancy, the sensitive data permissions, the variable access permissions, and other data may be written to output and/or used to automatically edit the variable access permission to correct the discrepancy. The variable access permissions for a user and/or application to access a variable may be changed to restrict access in response to a discrepancy between the variable access permission and the sensitive data permission.

The systems and methods herein provide a scanning tool to detect sensitive data in a big data environment such as BDMS 200. The scanner may traverse all or part of a big data file system and scan individual files. The scanner may then identify possible sensitive data elements within those files based on patterns and/or known lists of sensitive information. If PII is found, the file and location within the file may be logged. The access rights for the file may be checked to determine whether the file owner has permission to use and retain the sensitive data. The scanner may then report violations detected and provide support for auditing data use. The scanner of the present disclosure thus enables tracks sensitive data usage when the underlying data may be subject to changes.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   retrieving, by a processor, a pattern from a pattern database,
   wherein the pattern includes a collection of regular expressions written to match sensitive data,
   wherein the pattern includes a format of a text pattern matching utility, and
   wherein the pattern identifies a type of the sensitive data;
   retrieving, by the processor, data from a big data management system, wherein the data is identified by a variable that identifies a collection of the data;
   matching, by the processor, the data to the pattern;
   detecting, by the processor and based on the matching, text that matches the data;
   matching, by the processor, the data to a known list of the sensitive data;
   determining, by the processor and based on the matching, that a subset of the data is the sensitive data;
   determining, by the processor, the type of the sensitive data in the subset of the data;
   logging, by the processor, a location within a file of the subset of the data;
   retrieving, by the processor, a variable access permission for the variable from a permissions repository;
   retrieving, by the processor, a sensitive data permission for the type of sensitive data from the permissions repository;
   comparing, by the processor, the variable access permission to the sensitive data permission to detect a discrepancy;
   generating, by the processor, an output of the type of sensitive data and the discrepancy;
   automatically editing, by the processor, the variable access permission to correct the discrepancy; and
   restricting, by the processor, access to the subset of the data in the big data management system, based on the editing.

2. The method of claim 1, further comprising scheduling, by the processor, the retrieving the pattern from the pattern database to execute automatically at a predetermined time.

3. The method of claim 2, wherein the output comprises at least one of a log, an output file, an email, or a message that flags at least one of the data, the variable access permission, or the sensitive data permission for review.

4. The method of claim 3, further comprising adding, by the processor, a new pattern to the pattern database to identify new types of sensitive data.

5. The method of claim 4, wherein the pattern further comprises a string.

6. The method of claim 5, further comprising assigning, by the processor, a priority of execution to the comparing the data to the pattern to run the comparing the data to the pattern as a background process.

7. A computer-based system, comprising:
   a processor; and
   a tangible, non-transitory memory configured to communicate with the processor, the tangible, non-transitory memory having instructions stored thereon that, in response to execution by the processor, cause a data scanning system to perform operations comprising:
   retrieving, by the processor, a pattern from a pattern database,
   wherein the pattern includes a collection of regular expressions written to match sensitive data,
   wherein the pattern includes a format of a text pattern matching utility, and
   wherein the pattern identifies a type of the sensitive data;
   retrieving, by the processor, data from a big data management system, wherein the data is identified by a variable that identifies a collection of the data;

matching, by the processor, the data to the pattern;

detecting, by the processor and based on the matching, text that matches the data;

matching, by the processor, the data to a known list of the sensitive data;

determining, by the processor and based on the matching, that a subset of the data is the sensitive data;

determining, by the processor, the type of the sensitive data in the subset of the data;

logging, by the processor, a location within a file of the subset of the data;

retrieving, by the processor, a variable access permission for the variable from a permissions repository;

retrieving, by the processor, a sensitive data permission for the type of sensitive data from the permissions repository;

comparing, by the processor, the variable access permission to the sensitive data permission to detect a discrepancy;

generating, by the processor, an output of the type of sensitive data and the discrepancy;

automatically editing, by the processor, the variable access permission to correct the discrepancy; and restricting, by the processor, access to the subset of the data in the big data management system, based on the editing.

8. The method of claim 1, further comprising retrieving, by the processor, an action code associated with the pattern.

9. The method of claim 6, further comprising:

retrieving, by the processor, an action code associated with the pattern; and conducting, by the processor, an action associated with the action code.

10. The method of claim 9, wherein the action code is associated with at least one of quarantining the data, flagging the data for review, locking down a user account lacking permission to view the data, incrementing a counter for a number of matches in a column or modifying permissions to access the data.

11. The computer-based system of claim 7, wherein the pattern further comprises a string.

12. The computer-based system of claim 7, further comprising assigning, by the processor, a priority of execution to the comparing the data to the pattern to run the comparing the data to the pattern as a background process.

13. An article of manufacture including a non-transitory, tangible computer readable storage medium having instructions stored thereon that, in response to execution by a processor, cause a data scanning system to perform operations comprising:

retrieving, by the processor, a pattern from a pattern database, wherein the pattern includes a collection of regular expressions written to match sensitive data, wherein the pattern includes a format of a text pattern matching utility, and wherein the pattern identifies a type of the sensitive data;

retrieving, by the processor, data from a big data management system, wherein the data is identified by a variable that identifies a collection of the data;

matching, by the processor, the data to the pattern;

detecting, by the processor and based on the matching, text that matches the data;

matching, by the processor, the data to a known list of the sensitive data;

determining, by the processor and based on the matching, that a subset of the data is the sensitive data;

determining, by the processor, the type of the sensitive data in the subset of the data;

logging, by the processor, a location within a file of the subset of the data;

retrieving, by the processor, a variable access permission for the variable from a permissions repository;

retrieving, by the processor, a sensitive data permission for the type of sensitive data from the permissions repository;

comparing, by the processor, the variable access permission to the sensitive data permission to detect a discrepancy;

generating, by the processor, an output of the type of sensitive data and the discrepancy;

automatically editing, by the processor, the variable access permission to correct the discrepancy; and restricting, by the processor, access to the subset of the data in the big data management system, based on the editing.

14. The article of claim 13, further comprising scheduling, by the processor, the retrieving the pattern from the pattern database to execute automatically at a predetermined time.

15. The article of claim 13, wherein the output comprises at least one of a log, an output file, an email, or a message that flags at least one of the data, the variable access permission, or the sensitive data permission for review.

16. The article of claim 13, wherein the pattern further comprises a string.

17. The article of claim 13, further comprising assigning, by the processor, a priority of execution to the comparing the data to the pattern to run the comparing the data to the pattern as a background process.

* * * * *